Aug. 13, 1935.   J. H. SMALL   2,011,125
FRYING ATTACHMENT FOR GAS STOVES
Filed Dec. 23, 1933
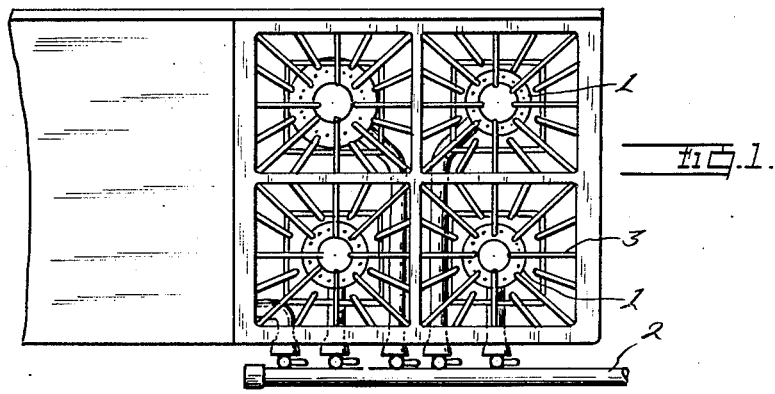
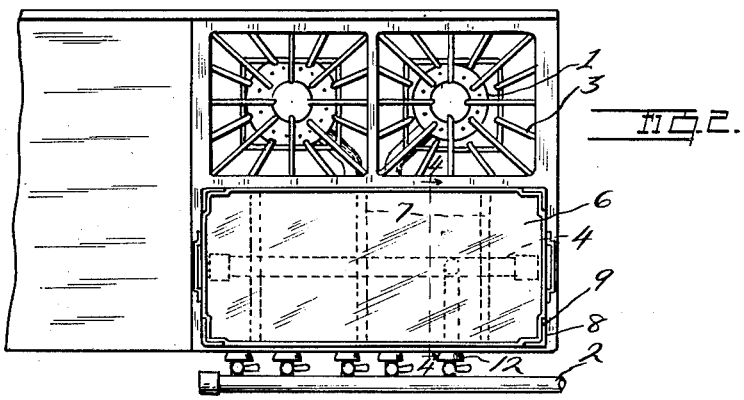
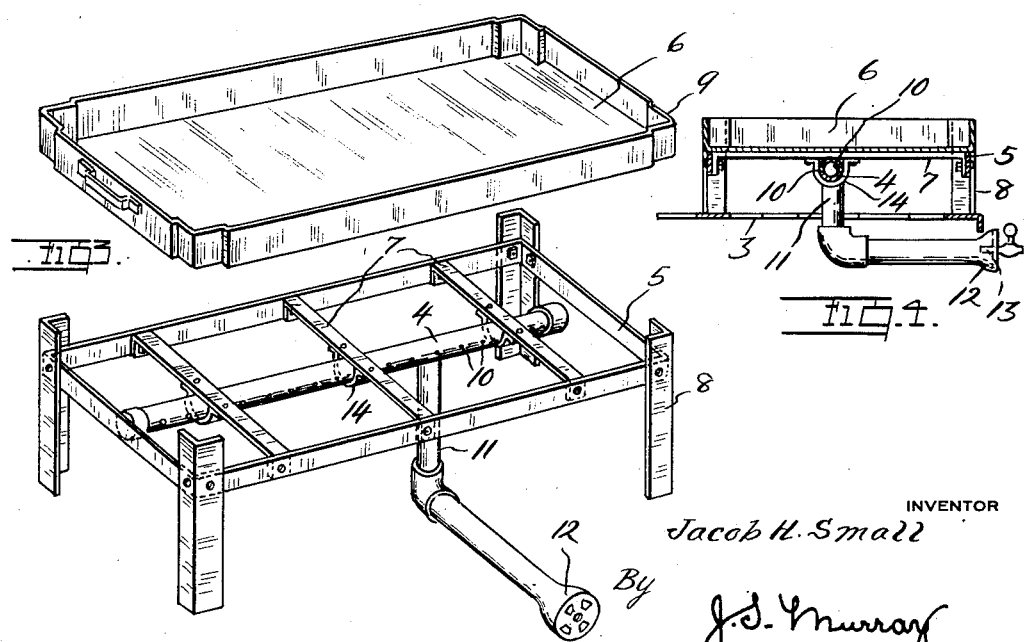
INVENTOR
Jacob H. Small
By J. S. Murray
ATTORNEY Patented Aug. 13, 1935

2,011,125

UNITED STATES PATENT OFFICE 2,011,125

FRYING ATTACHMENT FOR GAS STOVES

Jacob H. Small, Detroit, Mich.

Application December 23, 1933, Serial No. 703,766

2 Claims. (Cl. 126—40)

This invention relates to gas stoves and particularly to attachments for such stoves.

Gas cooking stoves commonly comprise an open-top section, having two front and two rear burners. Since none of these burners has a very large heating area, and they are too far apart for satisfactory conjoint use, several consecutive cooking operations are necessary when food is to be fried for more than a few people, so that the meal must be served piece-meal, or a portion thereof must be kept warm while the remainder is cooked.

It is an object of the invention to expedite preparation of large meals on the open top section of a gas stove, and to minimize the consumption of gas in such preparation, by providing a special burner, of large heating area, to temporarily replace a burner of the open top section, and by further providing a large pan for use above such burner.

Another object is to adapt the temporary burner to be installed in or removed from the stove quickly and easily and with a minimum disturbance of the normal assembly.

A further object is to mount the temporary burner upon a frame, adapted to rest upon the open top section of the stove, and to further utilize said frame to seat a large-capacity frying pan or baking pan for use above said burner.

These and various other objects, the invention attains by the construction hereinafter described and illustrated in the accompanying drawing, wherein:

Fig. 1 is a top plan view of the open top section of an ordinary gas cook stove.

Fig. 2 is a similar view showing my attachment installed.

Fig. 3 is a perspective view of the attachment, showing the frying pan spaced above the frame which carries the burner.

Fig. 4 is a cross sectional view, taken on the line 4—4 of Fig. 2.

In these views, the reference character 1 designates the open top burners of a gas stove, 2 the usual pipe extending at the front of the stove for delivering gas to said burners, and 3 the usual grid.

The present attachment comprises primarily a burner 4 of large heating area, a frame 5, carrying said burner and a frying pan 6, adapted to removably seat on said frame.

Said frame may be fashioned of strap iron bent to rectangular form, and reinforced by several cross bars 7, which may also be of strap iron. At its corners the frame is mounted on legs 8, which are preferably angle bars, and which project slightly above the frame for positioning engagement with the pan 6. Said legs exteriorly engage the frame, being riveted or otherwise rigidly secured thereto, and the marginal wall of the pan has it corner portions inwardly offset at 9 to accommodate the upward extensions of the legs, while permitting the pan to seat between said extensions, on the main body of the frame.

The burner 4 consists of a length of pipe closed at its ends, and having two diametrically opposed rows of laterally opening gas outlets 10. Said burner further comprises a gas delivery tube 11, projecting downwardly a sufficient distance to pass through the grid 3 when the legs 8 rest thereon, and extended forwardly at its lower portion sufficiently to connect with the pipe 2 (see Fig. 4).

The front end of said delivery tube has the usual enlargement 12, with regulable air inlet openings therein, said enlargement being releasably engageable, in the usual manner, with a rearwardly projecting nipple 13 on the pipe 2. The burner pipe extends centrally beneath the frame, longitudinally thereof, and is suitably secured thereto, as by U shaped clamping members 14, bolted to the cross bars 7.

In use of the described attachment, a certain one of the front burners 1 is disengaged from the corresponding nipple 13, and shifted out of place. The delivery tube 11 of the attachment burner is then projected through the grid (without disturbing the latter) and is shifted to make connection with said nipple 13, the arrangement being such that when such connection is established, the legs 8 rest upon the ends of the grid. Upon setting the pan 6 in place, (as shown in Fig. 2), the attachment is ready for use.

It will be noted that the pan 6 has an area substantially equal to that of the entire front half of the open top, and that the burner 4 is of a type adapted to heat said burner with substantial uniformity throughout said area. Thus the attachment permits frying, in one operation, of a considerable quantity of food, saving time, avoiding necessity for reheating, assuring a uniform application of heat, and minimizing gas consumption.

The invention is presented as including all such modifications and changes as come within the scope of the following claims.

What I claim is:

1. An attachment for a gas stove of the type having a gas supply pipe at the front of the stove, a burner detachably connected to said pipe and a grid above such burner, said attachment comprising a cooking utensil support, having legs for elevating it above said grid, and a replacement burner carried by said support and having a gas delivery tube, comprising a downwardly extending portion adapted to pass through said grid and a relatively transverse portion adapted to project forwardly beneath the grid and connect with said gas supply pipe.

2. An attachment as set forth in claim 1, said burner being disposed beneath said support and extending approximately the full length of the support.

JACOB H. SMALL.